United States Patent
Lesueur et al.

(10) Patent No.: US 8,869,575 B2
(45) Date of Patent: Oct. 28, 2014

(54) STEERING LOCK DEVICE WITH INSERTABLE LOCK CYLINDER WHICH IS INTENDED, FOR EXAMPLE, FOR MOTOR VEHICLES

(75) Inventors: Guillaume Lesueur, Créteil Cedex (FR); Frédéric Maltaverne, Créteil Cedex (FR)

(73) Assignee: Valeo Securite Habitacle, Créteil Cedex (FR)

( * ) Notice: Subject to any disclaimer, the term of this patent is extended or adjusted under 35 U.S.C. 154(b) by 1543 days.

(21) Appl. No.: 11/630,008

(22) PCT Filed: Jun. 14, 2005

(86) PCT No.: PCT/EP2005/052755
§ 371 (c)(1),
(2), (4) Date: Dec. 31, 2007

(87) PCT Pub. No.: WO2005/123469
PCT Pub. Date: Dec. 29, 2005

(65) Prior Publication Data
US 2008/0110219 A1    May 15, 2008

(30) Foreign Application Priority Data
Jun. 17, 2004   (FR) .................................. 04 06602

(51) Int. Cl.
*B60R 25/02*     (2013.01)
*B60R 25/021*    (2013.01)

(52) U.S. Cl.
CPC ................. *B60R 25/0211* (2013.01)
USPC ................................ 70/186; 70/237; 70/252

(58) Field of Classification Search
USPC .................................. 70/181–187, 252, 237
See application file for complete search history.

(56) References Cited

U.S. PATENT DOCUMENTS

| | | | | |
|---|---|---|---|---|
| 3,877,265 A | * | 4/1975 | Schaumberg | 70/252 |
| 4,972,692 A | * | 11/1990 | Morikawa et al. | 70/186 |
| 5,271,252 A | * | 12/1993 | Yasuhara et al. | 70/186 |

(Continued)

FOREIGN PATENT DOCUMENTS

| | | |
|---|---|---|
| EP | 0 953 487 | 11/1999 |
| EP | 1 069 010 | 1/2001 |

(Continued)

OTHER PUBLICATIONS

International Search Report for PCT/EP2005/052755 mailed Sep. 27, 2005 (2 pages).

(Continued)

*Primary Examiner* — Christopher Boswell
(74) *Attorney, Agent, or Firm* — Osha Liang LLP (57) ABSTRACT

An antitheft steering lock device with an insertable bolt particularly for a motor vehicle, including an antitheft lock body including a first portion with a locking mechanism capable of immobilizing a movable steering element, and a second portion where a bolt is inserted and positively connected inside the second portion, and wherein the bolt is capable of controlling the use of the locking means, wherein the antitheft lock device further includes blocking means capable of inhibiting the use of the locking means when the bolt is removed after the bolt has been positively connected inside the second portion of the antitheft lock body.

10 Claims, 6 Drawing Sheets

(56) References Cited

U.S. PATENT DOCUMENTS

| | | | | |
|---|---|---|---|---|
| 5,570,599 | A * | 11/1996 | Konii | 70/186 |
| 5,632,167 | A * | 5/1997 | Kawachi et al. | 70/186 |
| 6,076,382 | A * | 6/2000 | Naganuma | 70/186 |
| 6,233,986 | B1 * | 5/2001 | Suzuki et al. | 70/186 |
| 6,295,848 | B1 * | 10/2001 | Suzuki | 70/186 |
| 6,539,756 | B2 * | 4/2003 | Bartels et al. | 70/186 |
| 6,941,781 | B2 * | 9/2005 | Fukushima | 70/252 |
| 8,033,148 | B2 * | 10/2011 | Okada et al. | 70/186 |
| 8,499,596 | B2 * | 8/2013 | Maltaverne et al. | 70/186 |
| 2004/0075232 | A1 * | 4/2004 | Zillmann | 280/89 |
| 2004/0148983 | A1 * | 8/2004 | Suzuki et al. | 70/186 |
| 2010/0064742 | A1 * | 3/2010 | Okada et al. | 70/185 |

FOREIGN PATENT DOCUMENTS

| | | |
|---|---|---|
| FR | 2 820 385 | 8/2002 |
| JP | 2003327084 A | 11/2003 |
| JP | 2004114730 A | 4/2004 |
| JP | 200467037 A1 | 9/2007 |
| WO | WO-02/085678 | 10/2002 |

OTHER PUBLICATIONS

Japanese Office Action for Application No. 2007-515,954, mailed Nov. 30, 2010, and English translation thereof, (2 pages).

* cited by examiner

STEERING LOCK DEVICE WITH INSERTABLE LOCK CYLINDER WHICH IS INTENDED, FOR EXAMPLE, FOR MOTOR VEHICLES

The present invention relates to an antitheft lock device that is designed to protect a vehicle steering mechanism.

The invention finds a particularly advantageous application in the motor vehicle field.

Because of the modular design of current motor vehicles, it is nowadays usual to preassemble various members together far in advance of the final assembly of the vehicle. This is why the steering column, fitted with its antitheft lock, usually forms part of one and the same subassembly which mainly combines the fascia and the heating/air conditioning block and that is able to be mounted in a single unit inside the bodywork.

This assembly technique however means that the lock cylinder of the antitheft steering lock cannot a priori be assembled at the same time and/or in the same place as the lock cylinders of the various opening members of the vehicle, that are however intended to operate with the same key. In practice, this particular feature is of a kind to complicate the assembly of the motor vehicle on the assembly lines, while generating no small risks of losing keys and/or incompatibility between the various lock cylinders.

To remedy these difficulties, it is a known practice to use an antitheft steering lock of the insertable lock cylinder type, that is to say a device consisting of an antitheft lock body and a lock cylinder which initially constitute two separate subassemblies, but which are at any time capable of being positively connected together. Although this modular configuration is particular, the lock cylinder nevertheless remains conventionally responsible for controlling the use of locking means that are just as commonly incorporated into the antitheft lock body on the one hand, and designed to immobilize at least one movable steering element on the other hand.

Such an antitheft steering lock has the advantage of being able to be mounted in two stages, with first of all the antitheft lock body, then the lock cylinder. In the context of the problem, this feature makes it possible in the first place to assemble the antitheft lock cylinder independently of producing the fascia, in this instance after the antitheft lock body has been assembled on the steering column. But this feature also makes it possible to assemble the antitheft lock cylinder in a manner substantially concomitant with the other lock cylinders of the vehicle.

Antitheft steering locks with an insertable lock cylinder, that are known in the prior art however have the major disadvantage of having a relatively serious security weakness in the lock cylinder, since nothing is provided to counter the possibility of the latter being torn out. This portion of the antitheft lock device appears all the more vulnerable because the lock cylinder is a fitted piece, and because, as such, it can in no way be incorporated and positively connected as effectively as if it had been installed as an internal component of a single-piece antitheft lock device.

The result of this is that, in this type of antitheft lock device, the lock cylinder is in the end always relatively accessible and never optimally held inside the antitheft lock body. The removal of the lock cylinder, particularly by tearing out, is consequently not an insurmountable operation. Once this act is accomplished, it is then possible to very easily gain access to the inside of the antitheft lock body, and consequently render the steering column locking means inoperative.

Also, the technical problem to be solved by the subject of the present invention is to propose an antitheft steering lock device with an insertable lock cylinder, particularly for a motor vehicle, comprising an antitheft lock body that consists of a first portion in which are incorporated locking means capable of immobilizing a movable steering element, and a second portion inside which is intended to be inserted and positively connected a lock cylinder capable of controlling the use of the locking means, an antitheft lock device which would make it possible to prevent the problems of the prior art by offering in particular a substantially enhanced level of inviolability, while retaining its capability to allow a deferred assembly of the antitheft lock body, on the one hand, and of the control lock cylinder, on the other hand.

The solution to the technical problem posed consists, according to the present invention, in that the antitheft lock device also comprises blocking means capable of inhibiting the use of the locking means if the lock cylinder is removed after it has been positively connected inside the second portion of the antitheft lock body.

The invention as thus defined has the advantage of being able to provide an antitheft steering lock whose lock cylinder may be assembled independently of the locking mechanism itself, but also of benefiting from a level of security that is considerably increased against break-in.

The present invention also relates to the features that will emerge during the following description and that must be considered in isolation or in all their possible technical combinations.

The description, given as a nonlimiting example, is designed to make it easier to understand what the invention consists in and how it may be embodied. This description is furthermore given with reference to the appended drawings in which:

FIG. 1 illustrates in perspective an antitheft steering lock device according to the subject of the present invention.

FIG. 2 is a transparent view of the opposite face of the antitheft steering lock device as shown in FIG. 1.

FIG. 3 is a view similar to FIG. 2, but showing only the antitheft lock body.

FIG. 4 shows in perspective and in detail the lock cylinder of the antitheft steering lock device, the lock cylinder that is already visible in FIG. 2.

FIG. 5 is a transparent view showing the relative disposition of the blocking means and of the locking means within the antitheft steering lock device.

FIG. 6 is a transparent view which shows in detail the interaction between the blocking means and the locking means of the antitheft steering lock device.

FIG. 7 illustrates the coupling between the lock cylinder and the blocking means of the antitheft steering lock device.

FIG. 8 is a view showing in detail a portion of the stator portion of the lock cylinder, which supports a lever for immobilizing the locking means.

FIG. 9 represents in perspective the removable retention element of the antitheft steering lock device.

FIG. 10 shows the positioning of the lever for immobilizing the locking means, inside the removable retention element of FIG. 9.

FIG. 11 illustrates in perspective the stator portion of the lock cylinder.

FIG. 12 shows in perspective the coupling between the stator portion of the lock cylinder and the removable retention element.

For reasons of clarity, the same elements have been indicated by identical reference numbers. Similarly, only the elements that are essential for the understanding of the invention have been shown, not to scale and schematically.

Figure 001:
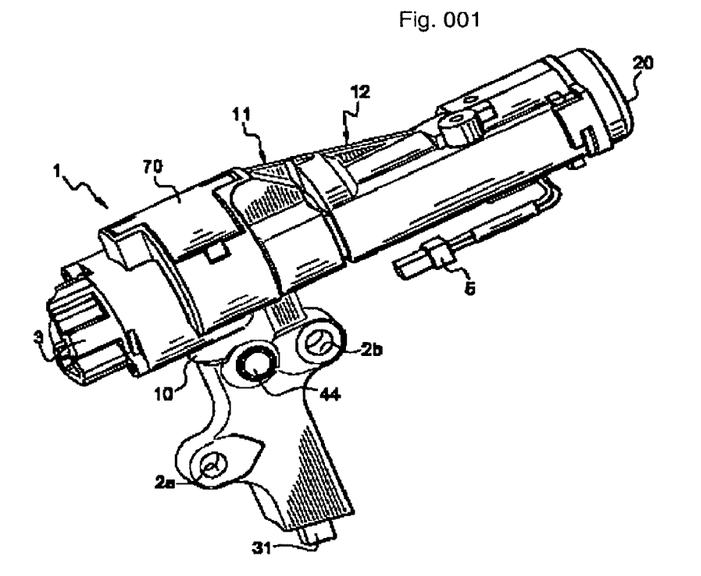
Figure 002:
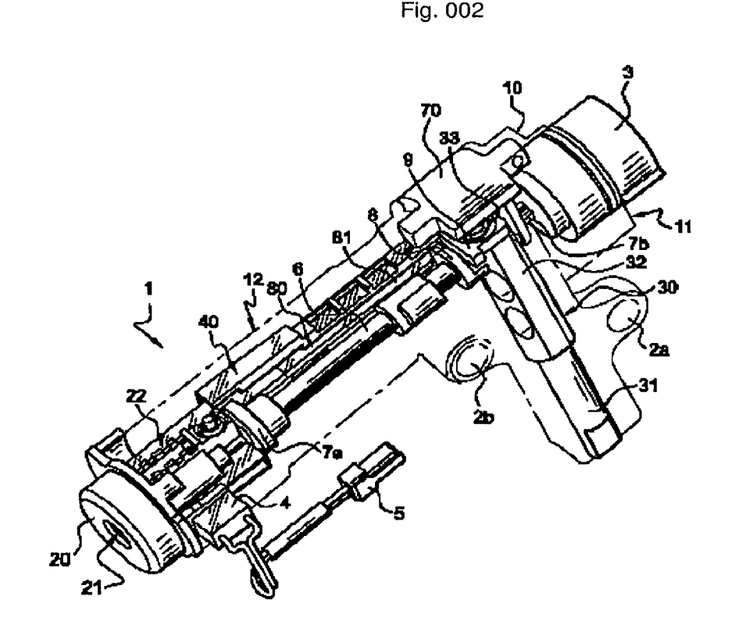

FIGS. 1 and 2 illustrate an antitheft lock device with an insertable lock cylinder 1, that is designed to be mounted in a motor vehicle to secure its steering. Two through-bores 2a, 2b are furthermore provided to receive fastening screws and therefore allow a positive connection in the immediate vicinity of the steering column.

The antitheft lock device 1 comprises an antitheft lock body 10 made of metal that is furnished with a first portion 11 in which are incorporated locking means 30 designed to immobilize a movable steering element. The antitheft lock body 10 is also provided with a second portion 12 inside which is inserted and positively connected a lock cylinder 20 that is for its part responsible for controlling the use of the locking means 30.

According to the subject of the present invention, the antitheft lock device 1 also has blocking means 40 that are capable of inhibiting the use of the locking means if the lock cylinder 20 is removed, after it has been positively connected inside the second portion 12 of the antitheft lock body 10.

It will be furthermore observed that, in this particular embodiment, given only as an example, the antitheft lock device 1 is conventionally furnished with a switch 3 responsible for activating the starting and various electrical functions of the motor vehicle. Note also at the lock cylinder 20, the just as usual presence of a key presence sensor that consists essentially of a detector 4 and a connector 5.

Figure 003:
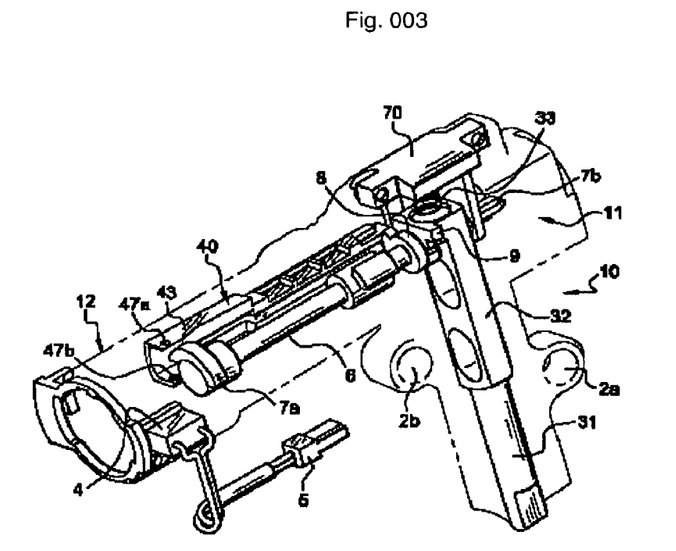

As can be seen more particularly in FIGS. 2 and 3 of this exemplary embodiment, the locking means 30 comprise a steel immobilization bolt 31 that is positively connected to a zamak traveler 32. The assembly is mounted so as to be movable in translation inside the antitheft lock body 10, but is also moved downward by means of elastic return means 33 shown here in the form of a compression spring.

The use of the locking means 30 is conventionally controlled by the lock cylinder 20, via a crankshaft 6 responsible also for actuating the switch 3.

So that the crankshaft 6 can fulfill its function as a transmission means, one of its ends 7a is shaped so as to interlock and thus interact by operation with the rotor portion 21 of the lock cylinder 20. The crankshaft 6 is also provided with a cam 8 that is capable of interacting with a shoulder 9 made on the traveler 32. The assembly is arranged so that the cam 8 is capable of lifting the traveler 32 causing it to move against the pressure exerted by the elastic return means 33.

For the crankshaft 6 also to be able to perform its other function as a switch actuator, its second end 7b is shaped so as to be able to interlock with a substantially complementary movable portion of the switch 3.

Figure 004:
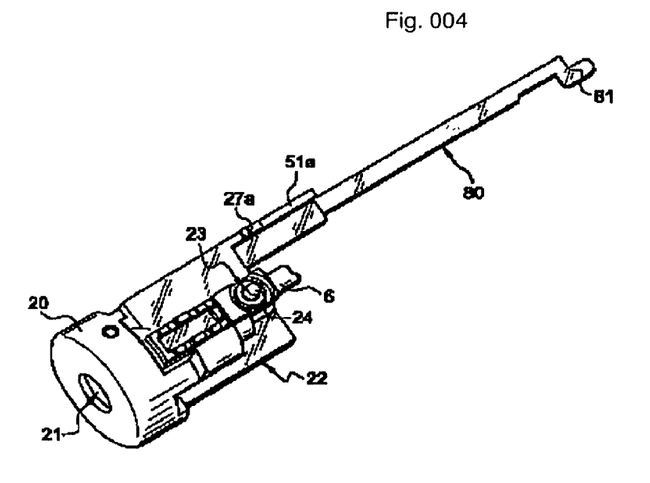

FIG. 4, for its part, more particularly highlights the structure of the insertable lock cylinder 20, and particularly its positive connection mechanism 23. In this exemplary embodiment, this positive connection mechanism 23 boils down to a spring-mounted pin 24, the whole thing being implemented on the surface of the stator portion 22 of the lock cylinder 20. Clearly this implies that a housing, of a shape substantially complementary to the pin 24, is made inside the second portion 12 of the antitheft lock body 10.

According to a currently preferred embodiment of the invention, the blocking means 40 are first of all furnished with an immobilization element 41 that is mounted so as to be movable. This mobility takes place between a passive position in which the immobilization element 41 is placed at a distance from the movable element of the locking means 30 (FIGS. 5 and 6), and an active position in which it interacts via immobilizing contact with said movable element, in this instance the traveler 32.

Figure 005:
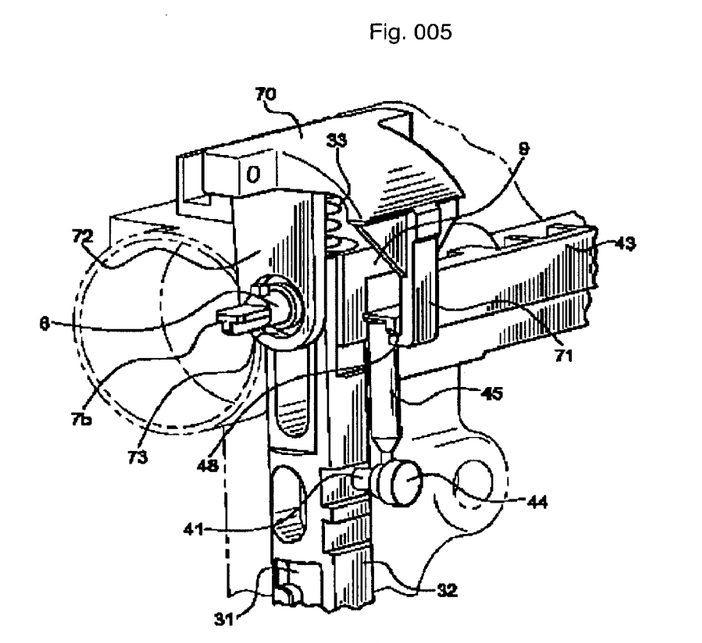
Figure 006:
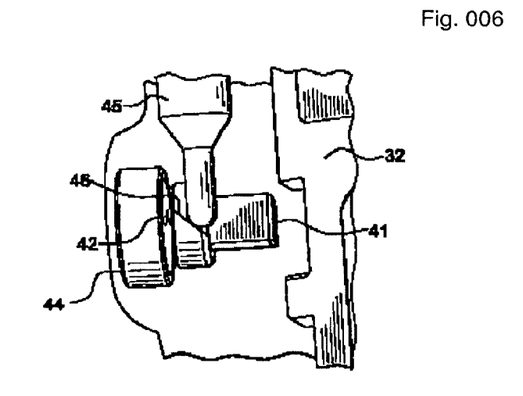

The blocking means 40 also comprise elastic return means 42 that are capable of moving the immobilization element 41 to its active position. In practice, this involves a compression spring which is placed between the immobilization element 41 and a cover plate 44 that is swaged into the antitheft lock body 10.

The blocking means 40 are also provided with a removable retention element 43 that is, on the one hand, capable of immobilizing the immobilization element 41 into a passive position, and, on the other hand, capable of being irreversibly coupled to the stator portion 22 of the lock cylinder 20 when said lock cylinder 20 is positively connected in the second portion 12 of the antitheft lock body 10.

Finally, and still according to this currently preferred embodiment of the invention, the assembly is arranged so that the removal of the removable retention element 43 is capable of releasing the mobility of the immobilization element 41 from its passive position to its active position.

According to FIGS. 5 and 6, note that, in this particular exemplary embodiment, the removable retention element 43 does not act directly on the immobilization element 41, but via a rod 45 that is mounted so as to move in translation in a direction substantially orthogonal to the movement of said immobilization element 41. The mobility of this intermediate rod 45 takes place between an engaged position and a disengaged position in which it is positioned respectively in contact with and at a distance from a ramp 46 made on the immobilization element 41.

The assembly is furthermore arranged so that, in the engaged position, the intermediate rod 45 is also immobilized in translation by the removable retention element 43, in a position such that the immobilization element 41 is then in a passive position. On the other hand, in the disengaged position, the removal of the removable retention element 43 makes it possible to release the mobility of the intermediate rod 45 and consequently that of the immobilization element 41. Since the latter is subjected to the pressure of the elastic return means 42, it will be able to move until it comes into contact with the traveler 32. The intermediate rod 45 is then simply pushed back upward under the effect of the ramp 46.

Naturally, it is totally possible to conceive an equivalent system in which the removable retention element 43 is capable of interacting without an intermediary on the immobilization element 41. In other words, the immobilization in the passive position of the immobilization element 41 by the removable retention element 43 may be achieved directly or indirectly.

It should be noted that "irreversible coupling" means any assembly of a sustainable or definitive nature, that is to say that cannot be separated without causing damage. It may also be, for example a clipping, a bonding, an interlocking via a retractable element, an interlocking with elastic deformation, etc. In the present case, only the person having the corresponding key for the actuation of the lock cylinder will be able to remove the latter from the antitheft lock without causing damage to the lock cylinder and/or to the antitheft lock.

Figure 007:
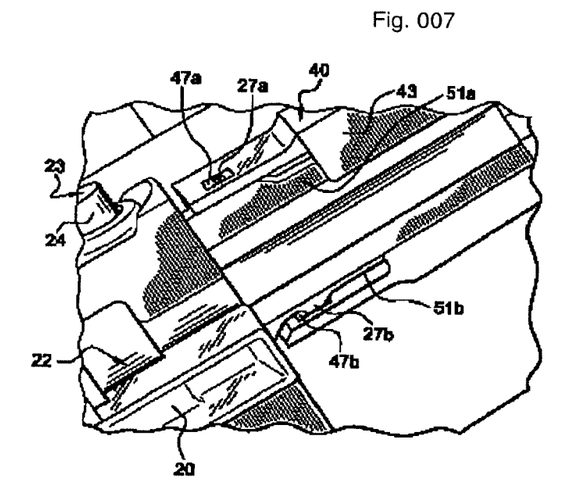

Preferably however, and as can be seen in FIG. 7, the irreversible coupling between the removable retention element 43 and the stator portion 22 of the lock cylinder 20 is achieved by means of at least one interlocking of two connection elements 27a, 27b, 47a, 47b whereof at least one is elastically deformable. In such a situation, the two connection elements 27a, 27b, 47a, 47b of one and the same interlocking are advantageously of substantially complementary shapes, and respectively positively connected to the stator portion 22 of the lock cylinder 20, on the one hand, and to the removable retention element 43, on the other hand.

Figure 008:
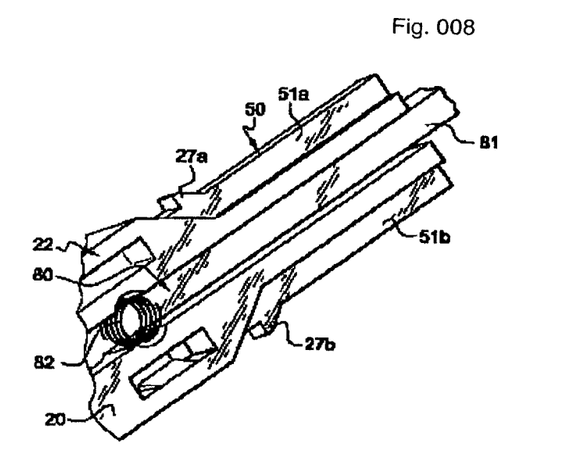

As can be seen more precisely in FIG. 8, the connection elements 27a, 27b positively connected to the stator portion 22 of the lock cylinder 20 have the shape of two protruding elements extending in opposite directions. On their side, the connection elements 47a, 47b supported by the removable retention element 43 consist of two holes made through the parallel walls that are also opposite (FIGS. 3 and 7).

According to a particular feature of the invention, the antitheft lock device 1 is furnished with means 50 that are capable of guiding the irreversible coupling between the stator portion 22 of the lock cylinder 20 and the removable retention element 43.

In a particularly advantageous manner, the guidance means 50 comprise at least one tongue 51a, 51b capable of interacting by sliding in a groove 52a, 52b in a direction substantially parallel to the direction of interlocking of the connection elements 27a, 27b, 47a, 47b. Each tongue 51a, 51b and its corresponding groove 52a, 52b may also be arranged respectively and without distinction on the stator portion 22 of the lock cylinder 20 and on the removable retention element 43.

Figure 009:
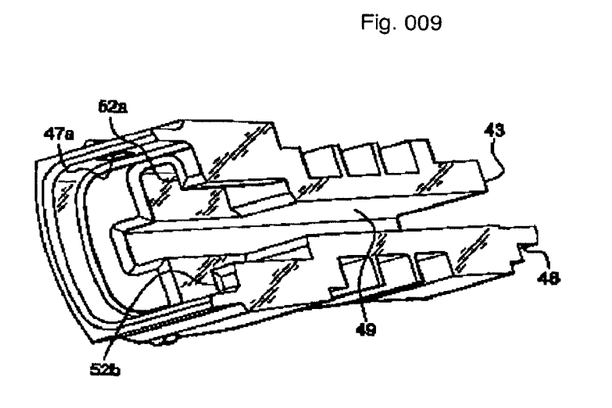
Figure 010:
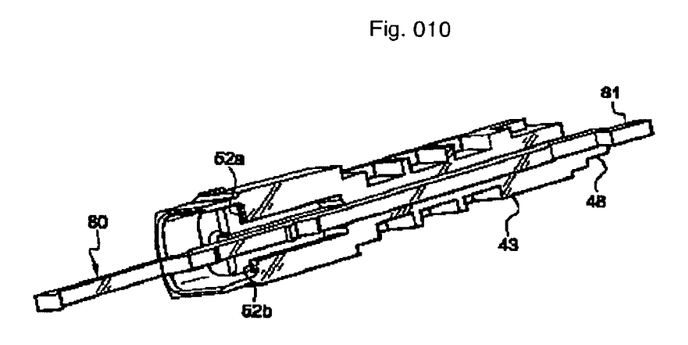
Figure 011:
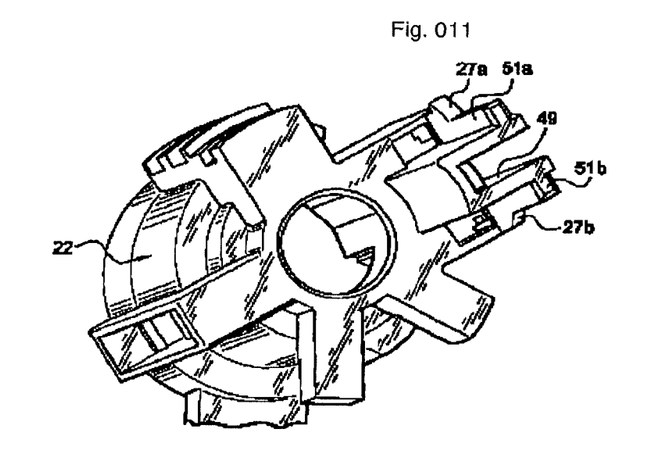
Figure 012:
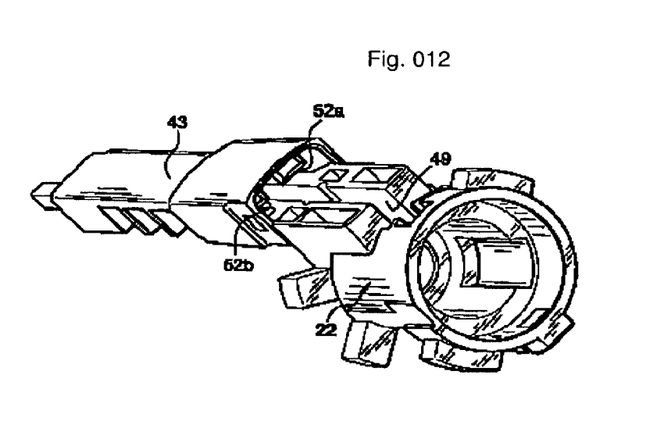

According to FIGS. 7 to 12, the stator portion 22 of the lock cylinder 20 is in practice provided with two tongues 51a, 51b which extend in one and the same plane but in opposite directions (FIG. 8), while the removable retention element 43 is furnished with two grooves 52a, 52b also coplanar but placed facing one another (FIG. 9).

Just like its counterparts with single-piece structures, the antitheft lock device with an insertable lock cylinder 1 according to the invention is affected by the passive safety standards relating to accidents. This is logically why it is perfectly envisageable to furnish it also with a fusible zone allowing the antitheft lock body 10 to break in two in the event of an impact with a lower limb of the driver. The purpose is quite clearly to prevent the portion 12 supporting the lock cylinder 20, that is by construction relatively rigid and protruding, from seriously damaging the physical integrity of the driver. This programmed fragility of the antitheft lock body 10 is a priori incompatible with the inviolability requirement of the antitheft lock device 1 considered in its entirety.

Therefore, and according to another particular feature of the invention, the first portion 11 and the second portion 12 of the antitheft lock body 10 are delimited by a fusible zone 60 capable of breaking if a force of an intensity above a given threshold is applied to said second portion 12 of the antitheft lock body 10. In such circumstances, the blocking means 40 are also advantageously capable of inhibiting the use of the locking means 30 if the fusible zone 60 is broken. It should be noted that the breakage may be caused equally by an accidental impact or by an impact during a break-in attempt.

Since the removable retention element 43 is positively connected to the stator portion 22 of the lock cylinder 20, which itself is positively connected to the second portion 12 of the antitheft lock body 10, the removable retention element 43 in question will remain positively connected to said second portion 12 of the antitheft lock body 10 if the fusible zone 60 breaks. The breakage of this protruding portion of the antitheft lock device 1 will consequently cause an implementation of the blocking means 40 which is identical to that which is caused in the event of simply removing the lock cylinder 20.

According to another particular feature of the invention, visible in FIGS. 1 to 3 and 5, the first portion 11 of the antitheft lock body 10 comprises a closure element 70 which is responsible for closing off an opening designed for installing at least one portion of the locking means 30 inside said antitheft lock body 10. In this situation, the blocking means 40 are also advantageously capable of inhibiting the use of the locking means 30 if the closure element 70 is removed, or even if there is simply an attempt at removal.

In a particularly advantageous manner, the closure element 70 is furnished with an anchoring lug 71 capable of being coupled to a bearing surface 48, forming a stop, that is arranged on the removable retention element 43, in opposition relative to said closure element 70. The removable retention element 43 is also of a type to deform elastically in the direction of the closure element 70. The assembly is arranged so that the elastic deformation of the removable retention element 43 is capable of releasing the mobility of the immobilization element 41 from its passive position to its active position.

FIG. 5 also shows that the closure element 70 is conventionally provided with a retention lug 72 through which a bore 73 is made designed for the passage of the crankshaft 6.

According to another particular feature of the invention, that can be seen at least partially in FIGS. 2, 4, 8 and 10, the antitheft steering lock device 1 is provided with immobilization means 80 that are capable of rendering the locking means 30 inoperative when the lock cylinder 20 is furnished with its key.

These immobilization means 80 are first of all furnished with an immobilization lever 81 that is mounted so as to move by pivoting on the stator portion of the lock cylinder 20 (FIG. 8). This mobility takes place between an active position in which the immobilization lever 81 is capable of immobilizing a movable element 32 of the locking means 30, and a passive position in which it is placed at a distance from the movable element 32 in question.

The immobilization means 80 are also provided with elastic return means 82 that are capable of pivoting the immobilization lever 81 to its passive position. It should be noted that this feature is associated here with the fact that the insertion of a key into the lock cylinder 20 is, on the other hand, capable of pivoting the immobilization lever 81 to its active position.

Still according to this same particular feature of the invention, the removable retention element 43 has, for its part advantageously a groove 49 that is capable of guiding the pivoting of the immobilization lever 81 between its passive position and its active position (FIGS. 9 to 12).

Quite clearly, the invention also relates to any motor vehicle comprising at least one antitheft steering lock device 1 as defined above.

The invention claimed is:

1. An antitheft steering lock device comprising:
an antitheft lock body comprising:
a first portion comprising locking means capable of immobilizing a movable steering element, and
a second portion, wherein a lock cylinder is inserted and positively connected inside the second portion, and wherein the lock cylinder is capable of controlling the use of the locking means; and
blocking means, distinct from the locking means, capable of inhibiting the use of the locking means when the lock cylinder is removed after the lock cylinder has been positively connected inside the second portion of the antitheft lock body,
wherein the blocking means comprise:
an immobilization element mounted so as to be movable between a passive position in which the immobilization element is placed at a distance from a movable element of the locking means, and an active position in which it interacts via immobilizing contact with said movable element of the locking means to immobilize the movable steering element;

elastic return means capable of moving the immobilization element into the active position; and a removable retention element that toggles the immobilization element between the passive position and the active position via an intermediate rod, and that is capable of being irreversibly coupled to a stator portion of the lock cylinder when said lock cylinder is positively connected in the second portion of the antitheft lock body, and wherein the removal of the removable retention element, during removal of the lock cylinder, is capable of releasing the mobility of the immobilization element from the passive position to the active position, wherein said movable element immobilizes the movable steering element, and wherein a length of the intermediate rod is perpendicular to a length of the removable retention element.

2. The antitheft steering lock device as claimed in claim 1, wherein the removable retention element achieves a coupling when coupled to the stator portion, wherein the coupling between the removable retention element and the stator portion of the lock cylinder is achieved by means of at least one interlocking of two connection elements, at least one of which is elastically deformable, wherein the two connection elements are complementary shapes and respectively positively connected to said stator portion of the lock cylinder and to the removable retention element.

3. The antitheft steering lock device as claimed in claim 1, further comprising:
means capable of guiding the coupling between the stator portion of the lock cylinder and the removable retention element.

4. The antitheft steering lock device as claimed in claim 3, wherein the guidance means comprise at least one tongue capable of interacting by sliding in a groove in a direction substantially parallel to the direction of interlocking of the connection elements, wherein the at least one tongue and the corresponding groove are arranged respectively and without distinction on the stator portion of the lock cylinder and on the removable retention element.

5. The antitheft steering lock device as claimed in claim 1, wherein the first portion and the second portion of the antitheft lock body are delimited by a fusible zone capable of breaking when a force of an intensity above a given threshold is applied to said second portion of the antitheft lock body, and wherein the blocking means are also capable of inhibiting the use of the locking means when said fusible zone is broken.

6. The antitheft steering lock device as claimed in claim 1, wherein the first portion of the antitheft lock body comprises a closure element capable of closing off an opening designed for installing at least one portion of the locking means inside said antitheft lock body, and wherein the blocking means are also capable of inhibiting the use of the locking means when said closure element is removed.

7. The antitheft steering lock device as claimed in claim 6, wherein the closure element comprises an anchoring lug capable of being coupled to a bearing surface, forming a stop, that is arranged on the removable retention element in opposition relative to said closure element, wherein the removable retention element is capable of deforming elastically in the direction of the closure element, and wherein the elastic deformation of said removable retention element is capable of releasing the mobility of the immobilization element from the passive position to the active position.

8. The antitheft steering lock device as claimed in claim 1, further comprising:
immobilization means capable of rendering the locking means inoperative when the lock cylinder is furnished with the key, the immobilization means comprising:
an immobilization lever mounted so as to move by pivoting on the stator portion of the lock cylinder between an active position in which the immobilization lever is capable of immobilizing a movable element of the locking means and a passive position in which the immobilization lever is placed at a distance from said movable element, and
elastic return means capable of pivoting the immobilization lever to the passive position,
wherein the insertion of the key into the lock cylinder results in pivoting the immobilization lever to the active position, and
wherein the removable retention element comprises a groove capable of guiding the pivoting of the immobilization lever between the passive position and the active position.

9. A motor vehicle, wherein the motor vehicle comprises at least one antitheft steering lock device as claimed in claim 1.

10. An antitheft steering lock device comprising:
an antitheft lock body comprising:
a first portion comprising locking means capable of immobilizing a movable steering element, and
a second portion, wherein a lock cylinder is inserted and positively connected inside the second portion, and wherein the lock cylinder is capable of controlling the use of the locking means; and
blocking means, distinct from the locking means, capable of inhibiting the use of the locking means when the lock cylinder is removed after the lock cylinder has been positively connected inside the second portion of the antitheft lock body,
wherein the blocking means comprise:
an immobilization element mounted so as to be movable between a passive position in which the immobilization element is placed at a distance from a movable element of the locking means, and an active position in which it interacts via immobilizing contact with said movable element of the locking means to immobilize the movable steering element;
elastic return means capable of moving the immobilization element into the active position; and
a removable retention element that toggles the immobilization element between the passive position and the active position, wherein the removable retention element, when the lock cylinder is positively connected in the second portion of the antitheft lock body, is interlockingly coupled to a stator portion of the lock cylinder, and wherein the removal of the removable retention element, during removal of the lock cylinder, releases the mobility of the immobilization element from the passive position to the active position, wherein said movable element immobilizes the movable steering element.

* * * * *